US009552232B2

United States Patent
Mukherjee et al.

(10) Patent No.: US 9,552,232 B2
(45) Date of Patent: Jan. 24, 2017

(54) SYSTEM AND PROCESS TO RECOMMEND CLOUD SERVICE CLOUD CONFIGURATION BASED ON SERVICE SIMILARITY

(71) Applicant: Xerox Corporation, Norwalk, CT (US)

(72) Inventors: Tridib Mukherjee, Bangalore (IN); Gueyoung Jung, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 188 days.

(21) Appl. No.: 13/795,566

(22) Filed: Mar. 12, 2013

(65) Prior Publication Data

US 2014/0280946 A1    Sep. 18, 2014

(51) Int. Cl.
*G06F 9/50* (2006.01)
*H04L 29/08* (2006.01)
*H04L 12/24* (2006.01)

(52) U.S. Cl.
CPC .......... *G06F 9/5072* (2013.01); *H04L 41/084* (2013.01); *H04L 41/5048* (2013.01); *H04L 67/16* (2013.01)

(58) Field of Classification Search
CPC .................................................. H04L 47/70
USPC ........................................................ 709/226
See application file for complete search history.

(56) References Cited

U.S. PATENT DOCUMENTS

| | | | |
|---|---|---|---|
| 2011/0295986 A1* | 12/2011 | Ferris et al. | 709/222 |
| 2012/0239739 A1* | 9/2012 | Manglik | G06F 9/5077 709/203 |
| 2012/0266159 A1* | 10/2012 | Risbood et al. | 717/177 |
| 2012/0271874 A1* | 10/2012 | Nugent | 709/201 |
| 2013/0117806 A1* | 5/2013 | Parthasarathy | G06F 21/604 726/1 |
| 2013/0124713 A1* | 5/2013 | Feinberg et al. | 709/224 |
| 2014/0200947 A1* | 7/2014 | Gujar | G06Q 30/0631 705/7.26 |

OTHER PUBLICATIONS

"Best Practice" definition, Oxford American English Dictionary, www.oxforddictionaries.com, 1 page.*
"Best Practice", Sep. 24, 2015, www.wikipedia.org, 9 pages.*

* cited by examiner

*Primary Examiner* — Wing F Chan
*Assistant Examiner* — Leon Y Tseng
(74) *Attorney, Agent, or Firm* — Fay Sharpe LLP

(57) ABSTRACT

A method provides a recommendation for a cloud configuration for deploying a service. In response to receiving a service request, a database is searched for a cloud configuration. The search is performed by acquiring a resource usage pattern for the service. The resource usage pattern is mapped to a multidimensional space, which is searched for a previously deployed cloud configuration having a similar resource usage pattern. In response to finding a previously deployed cloud configuration, the activity management is determined for the previously deployed cloud configuration. A recommendation is made based on the activity management.

21 Claims, 5 Drawing Sheets

SYSTEM AND PROCESS TO RECOMMEND CLOUD SERVICE CLOUD CONFIGURATION BASED ON SERVICE SIMILARITY

BACKGROUND

The present disclosure relates to a method and system that recommends a cloud configuration for deploying a cloud-based software service. More specifically, in response to a service request, the system searches a database for a cloud configuration based on previous cloud configurations for similar services.

An optimal cloud configuration, i.e., a combination of virtual machines (VMs), is desired by cloud users that want to deploy a software application into a cloud infrastructure. FIG. 1 shows a conventional approach for identifying a cloud configuration. Before the cloud user purchases the virtual machines that enable required performance of its service, it requests a cloud configuration from cloud providers at S10. Using cloud user preferences, available infrastructure is searched for the best cloud configuration at S12. The search from available infrastructure can be complicated when a large number of resource combinations are considered. The search space increases exponentially, based on the size of the infrastructure, to consider the different combinations as a cloud configuration. A cloud configuration recommendation is made based on the search from the infrastructure at S14. If the cloud user likes the recommendation, it can choose to deploy its service at S16.

There is currently no approach for scaling the cloud configuration search. Previous approaches focus on creating ontologies of cloud services. These ontologies deduce similarity of cloud services based on service types, functional attributes and system requirements. However, different service types may use the same cloud configurations based on resource usage behavior pattern and non-functional requirements, such as performance and cost. These service types may not consider the amount of resources being used by the service when it is hosted on the cloud. Although the requirements of different services are similar, the resource usage patterns of the services may be different.

In these instances, a different cloud configuration is desired which pertains to the non-functional preferences. A simplified approach for requesting and deploying services is further desired for cloud (e.g., small and medium business) users. An approach is desired that considers the service behavior in terms of the service's resource usage pattern for deducing service similarity using existing classification methods A recommendation service is desired through which cloud users can request services based on preferences regarding high-level service parameters (e.g. load, required performance, budget, etc.). A recommendation service is desired that can provide suggestions on the cloud configuration (e.g. number and type of VMs, platform, software, etc.) that can meet the requested preferences. And a recommendation service is desired that compares cost and performance offerings from multiple cloud vendors.

BRIEF DESCRIPTION

The disclosure relates to a system and process that deduces service similarity and uses the similarity to search a database for a cloud configuration. The system considers the service behavior and non-functional requirements as principal features for deducing similarity using existing classification methods.

One embodiment of the disclosure relates to a method for recommending a cloud configuration for deploying a service. In response to receiving a service request, the method includes searching a database for a cloud configuration. The method includes acquiring a resource usage pattern for the service. The method further includes mapping the resource usage pattern to a multidimensional space and searching the multidimensional space for a previously deployed cloud configuration having a similar resource usage pattern. In response to finding a previously deployed cloud configuration, the method includes determining an activity management for the previously deployed cloud configuration, i.e. whether the cloud configuration is still actively used by the services which were previously deployed on the configuration. The method further includes providing a recommendation based on the activity management.

Another embodiment of the disclosure relates to a system for recommending a cloud configuration for deploying a service. The system includes a memory that is adapted to store a cloud configuration search module and a cloud configuration management module. The cloud configuration search module searches a database for a cloud configuration. The cloud configuration search module is adapted to acquire a resource usage pattern for the service. The cloud configuration search module is further adapted to map the resource usage pattern to a multidimensional space and search the multidimensional space for a previously deployed cloud configuration having a similar resource usage pattern. The cloud configuration management module is adapted to determine an activity for the previously deployed cloud configuration and provide a recommendation based on the activity. The system includes a user interface that is adapted to receive a request for a service and output the recommendation. The system includes a processor that executes the modules.

DETAILED DESCRIPTION

The present disclosure relates to a method and system that recommends a cloud configuration. The system maintains a database that stores cloud configurations that were found by previous searches through available infrastructure. In order to reuse a previously searched cloud configuration, the system maintains the database of cloud configurations with corresponding service types, application types, and requested preferences for which the cloud configurations were searched. When a new service is requested, the database is searched and a correct cloud configuration is extracted based on the service's similarity with a previous cloud configuration.

Figure 1:
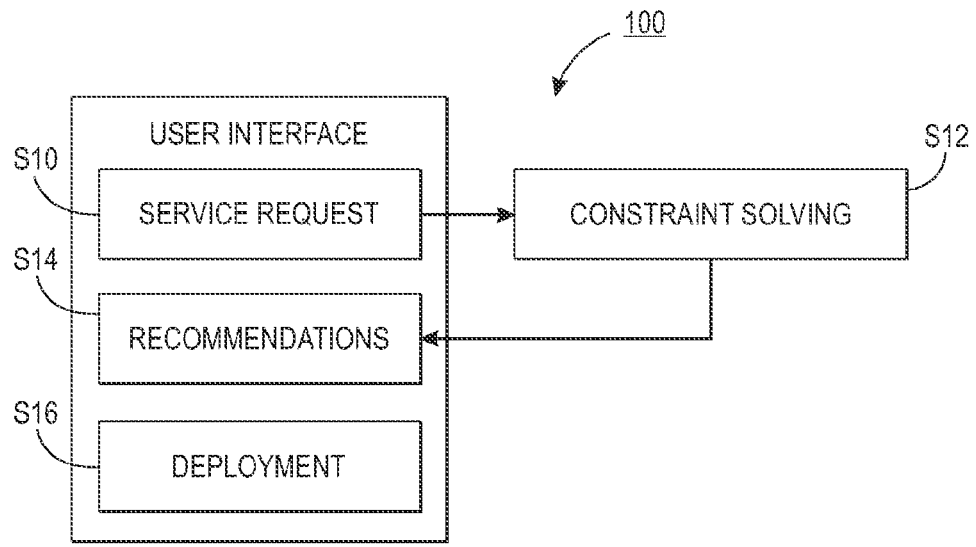
FIG. 1 shows a conventional approach for identifying a cloud configuration that can be used to deploy the software application according to the PRIOR ART.
Figure 2:
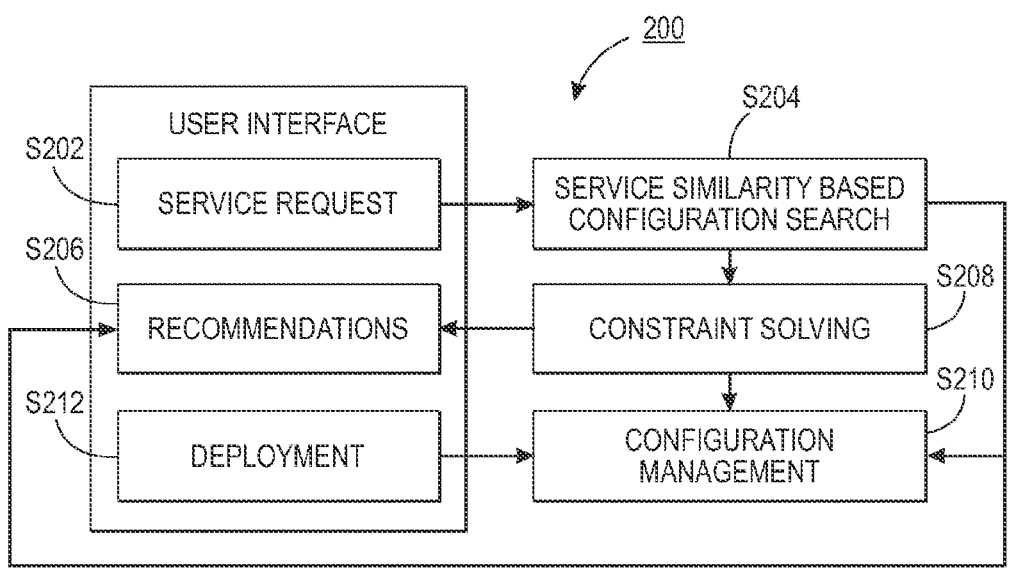
FIG. 2 is a general overview of a method 200 for recommending a cloud configuration according to the present embodiment.

FIG. 2 is a general overview of a method 200 for recommending the cloud configuration. In response to new requests at S202, the system searches cloud configurations that were previously deployed for services that are similar to the current service request at S204. In other words, a search of the database is based on service similarity. In this manner, repeat searches of the available infrastructure are eliminated or reduced. If a cloud configuration is found using the historical search at S204, a recommendation for the cloud configuration is provided to the cloud requester at S206. A search of the available infrastructure is filtered out. After a cloud configuration is found at S204, a status of the cloud configuration can be determined at S210. Mainly, the system determines whether the cloud configuration is available for being deployed at S210. If the cloud configuration is available, the cloud user can choose to deploy its service at S212. However, if no cloud configuration (i.e., previous similarity) is found using the historical search at S204, the available infrastructure is searched at S208. Any new configuration that is determined by the search is added to the database at S210. Then, a cloud configuration recommendation is made based on the search from the infrastructure at S206.

Figure 3:
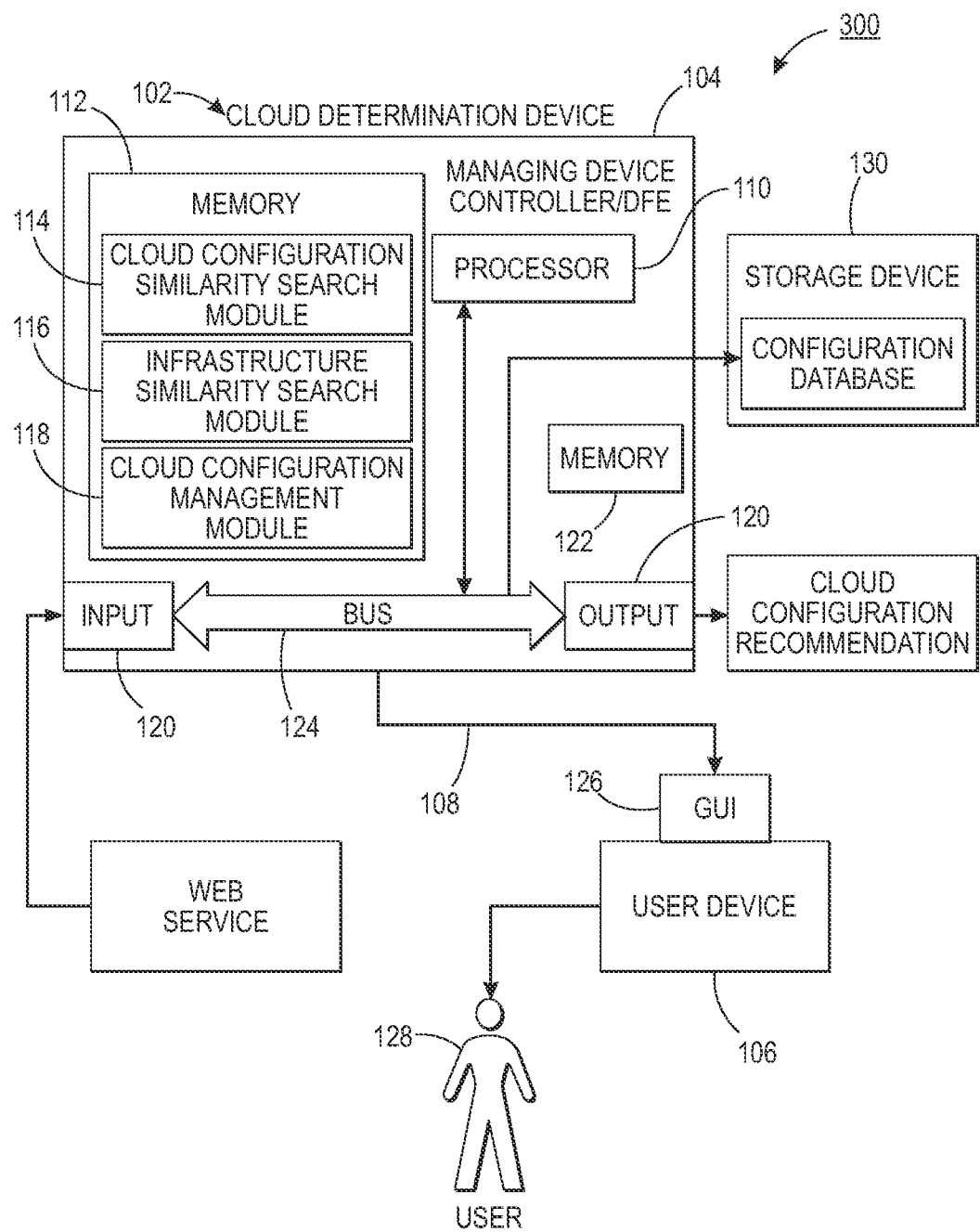
FIG. 3 is a schematic illustration of a cloud configuration recommendation system in one aspect of the exemplary embodiment.

FIG. 3 is a functional block diagram of a cloud recommendation system 100 in one exemplary embodiment. The system 100 includes a cloud determination device 102, hosted by a computing device 104, such as a server computer at a service provider site, and/or a user device 106, hosted by a computing device, at a customer site, such as a server, which can be linked together by communication links 108, referred to herein as a network. These components are described in greater detail below.

The cloud configuration determination device 102 illustrated in FIG. 3 includes a processor 110, which controls the overall operation of the cloud configuration determination device 102 by execution of processing instructions, which are stored in memory 112 connected to the processor 110.

The cloud configuration determination processes that are disclosed herein are performed by the processor 110 according to the instructions stored in the memory 112. In particular, the memory 112 stores cloud similarity search module 114, infrastructure search module 116, and cloud configuration management module 118.

The illustrated cloud similarity search module 114 searches a database for previously deployed cloud configurations having a similar resource usage pattern.

The infrastructure search module 116 searches an available infrastructure for cloud configurations when the database is empty or when no available configuration is found in the database.

The cloud configuration management module 118 adds and removes cloud configurations from the database. The module 118 also tags cloud configurations as being in active or inactive deployment. In other words, the module 118 manages a status of each cloud configuration in the database so that the system only provides recommendations for cloud configurations that are available for deploy.

The cloud configuration determination device 102 also includes one or more communication interfaces (I/O), such as network interfaces 120 for communicating with external devices, such as the user device 106. The various hardware components 110, 112, 120 of the cloud configuration determination device 102 may all be connected by a bus 124.

With continued reference to FIG. 3, the cloud configuration determination device 102 is communicatively linked to a user interface device (GUI) 126 via a wired and/or wireless link. In various embodiments, the user interface device 126 may include one or more of a display device, for displaying information to users, such as an optimal cloud recommendation to a human operator 128 for review, and a user input device, such as a keyboard or touch or writable screen, for inputting instructions, and/or a cursor control device, such as a mouse, trackball, or the like, for communicating user input information and command selections to the processor 110. Specifically, the user interface device 126 includes at least one of an input device and an output device, both of which include hardware, and which are communicatively linked with the server 104 via wired and/or wireless link(s).

With continued reference to FIG. 3, the cloud recommendation system 100 includes a storage device 130 that is part of or in communication with the cloud configuration determination device 102. In one embodiment, the cloud configuration determination device 102 can be in communication with a server (not shown) that hosts storage device 130 for storing the similarity database of previously searched cloud configurations.

The memory 112, 122 may represent any type of tangible computer readable medium such as random access memory (RAM), read only memory (ROM), magnetic disk or tape, optical disk, flash memory, or holographic memory. In one embodiment, the memory 112, 122 may each comprise a combination of random access memory and read only memory. The digital processor 110 can be variously embodied, such as by a single-core processor, a dual-core processor (or more generally by a multiple-core processor), a digital processor and cooperating math coprocessor, a digital controller, or the like. The digital processor 110, in addition to controlling the operation of the respective cloud configuration determination device 102, executes instructions stored in memory 112, 122 for performing the parts of the method outlined below.

The software modules as used herein, are intended to encompass any collection or set of instructions executable by the cloud configuration determination device 102 so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on the server or other location to perform certain functions.

The communication interfaces 120 may include, for example, a modem, a router, a cable, and/or Ethernet port, etc.

As will be appreciated, while two computing devices 104, 106 are illustrated by way of example, the system 100 may be hosted by fewer or more linked computing devices. Each computing device may include, for example, a server computer, desktop, laptop, or tablet computer, smartphone or any other computing device capable of implementing the method described herein.

Figure 4:
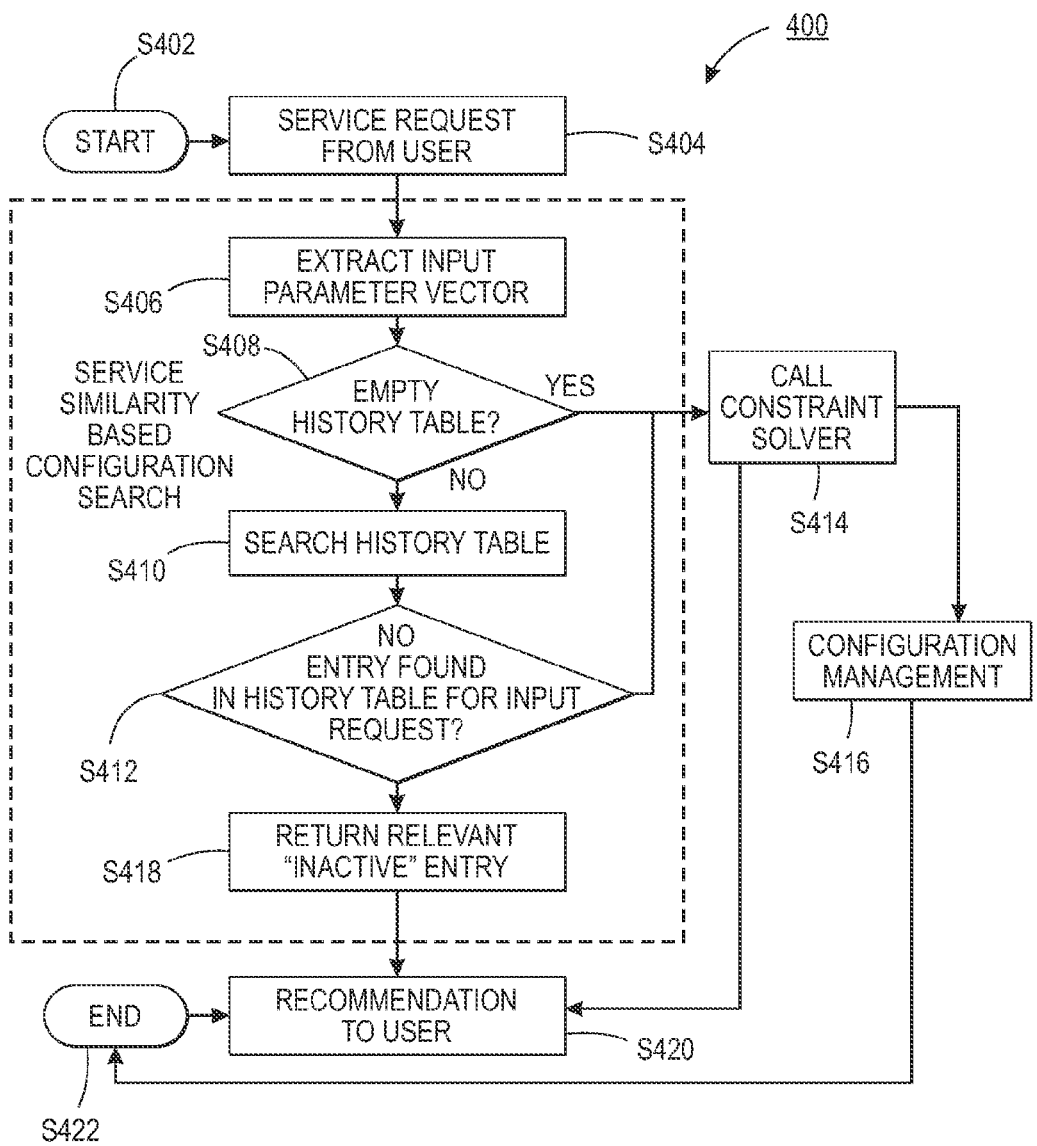
FIG. 4 is a flow chart illustrating an exemplary method 400 for identifying a cloud configuration according to another aspect of the exemplary embodiment.

FIG. 4 is a flow chart illustrating an exemplary method 400 for identifying a cloud configuration according to another aspect of the exemplary embodiment. The method starts at S402. The system 100 receives a service request for a cloud configuration that can be used to deploy a service at S404. In response to the service request, the system determines a resource usage pattern for the service. The resource usage pattern represents a behavior of the service. The term 'resource usage' is defined as being the capacity that a resource i needs to deploy the service. The resource i can include any subsystem of a virtual machine, such as, a CPU, a memory, disk, and n/w, etc.

Figure 5:
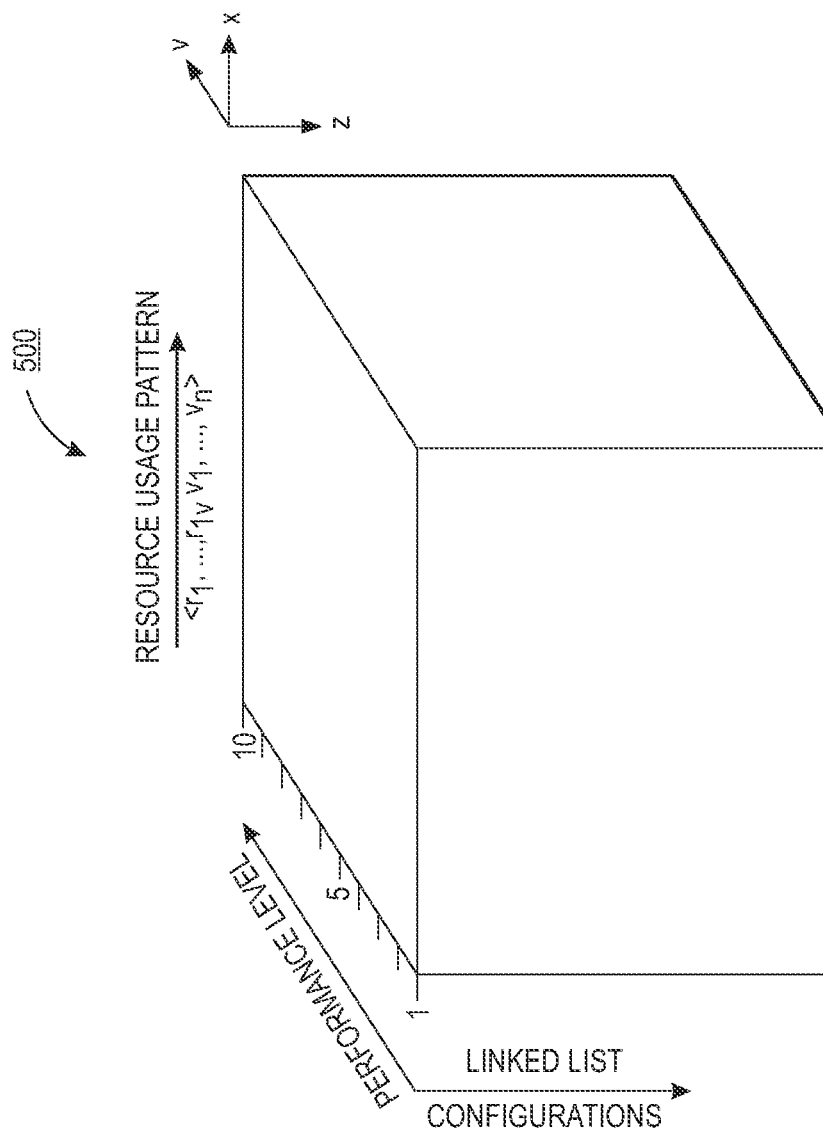
FIG. 5 shows a sample cloud configuration database being maintained as a multi-dimensional history table.

The system extracts a vector describing the resource usage pattern at S406. Features of the vector include the average resource usage $r_i$ and variance of the resource usage $v_i$ for resource i (i=1, ..., n). An example parameter vector $<r_1, ..., r_n, v_1, ..., v_n>$ is shown in FIG. 5. This resource usage parameter vector can be obtained in a controlled environment, whereby the service can be profiled on a dedicated profiling server.

Similarity can be computed based on how close the average resource usage $r_i$ and variance $v_i$ are with any previous service request. However, because there are no dedicated profiling servers in an uncontrolled environment, the exact average $r_i$ and variance $v_i$ values of the new, requested service may not be known. After the cloud similarity search module 114 extracts the parameters, the resource usage vector can be obtained through a probability distribution function e.g., a Gaussian distribution, in the uncontrolled environment. The parameters for a new service can be assumed and expected values can be computed to reduce complexity. There may be some distribution on these values. In such a case, the expected average $r_i$ and variance $v_i$ values can be used for new services and a Bayesian classifier can be used to detect similarity. In other words, an online estimation method, e.g., the Bayesian inference, can be employed to adapt the probability distribution functions based on actual resource usage.

There is no limit made herein to the type of classification method used to extract the parameters. Any existing classification method or future innovations in classifications can be used as part of the process. It is possible to infer similarity among two different services based on existing classification methodologies such as k-nearest neighbors, decision tree, or support vector machine (SVM) classifier.

In the illustrated embodiment, the resource usage pattern is mapped to a multidimensional space, which represents a history table and/or database. FIG. 5 shows a sample cloud configuration database 500 being maintained as a multidimensional history table. The sample table includes three dimensions each representing one of the x, y, and z axes. The earlier discussed service behavior is assigned to one axis, herein shown as the 'x' axis, but can be any axis. Each entry in the x-axis of the history table can be the exact values of the average $r_i$ and variance $v_i$ resource usage. In a more general case, each entry can be within a select range of average $r_i$ and variance $v_i$ values, which depend on a threshold closeness. The range can be based on the particular service classification model that is used.

In contemplated embodiments, the service that is seeking deployment may not have average $r_i$ and variance $v_i$ resource usage values that match with exact cloud configuration values, but its values may fall within a close range of the corresponding cloud configuration values. In this instance, similarity can still be deduced. The history table is flexible and is maintained to allow both cases. In the case when exact values are available, the number of points plotted along the ('x') axis would be greater than the number of cloud configuration points plotted along a different axis, such as the 'z' axis (see FIG. 5). If a value range is rather used, the list of cloud configurations plotted along the different axis would be greater than the case with an exact value because multiple cloud configurations would fall within the similarity range.

The system 100 determines whether cloud configurations are stored in the database at S408. In response to cloud configurations being stored in the table (NO at S408), the multidimensional space is searched for a previously deployed cloud configuration having a similar resource usage pattern at S410. In other words, the system looks up the database for cloud configurations that previously handled similar requests.

Although the service and a previously deployed service may have similar resource usage profiles, a similar cloud configuration used to deploy both services may not meet one of the cloud user's preferences. For example, the same service might be requested with different performance requirements. A service with high performance requirements is recommended cloud configurations that include high end virtual machines, and a service with low performance requirements receives a recommendation for a cloud configuration including low end VMs.

Therefore, the search through the database further takes into account user preferences (synonymously referred to herein as 'non-functional requirements'). When the system receives the request at S404, it also extracts and/or receives the cloud user's service preferences at S406. These preferences can relate to performance requirements (i.e., the processing time for responding to a request), budget/cost (i.e., the price for deployment), and green point, etc. In one embodiment, the system can prompt the user to provide the preferences as input. In one embodiment, each preference can be associated with another dimension in the multidimensional table.

However, in the discussed embodiment, a number of history tables can be maintained where the same dimension in each table is associated with a different non-functional parameter. In FIG. 5, the history table associates the 'y'-axis to a performance level as the non-functional requirement. The illustrated example shows ten different performance levels. A different history table can associate the 'y'-axis with cost. The system searches the table including the dimension that corresponds with the select fixed parameter. The system fixes one non-functional parameter that it applies to the history table while making an effort to determine a cloud configuration that also matches the other parameters.

One way the search can consider another parameter is to maintain a list of cloud configurations as a sorted list. Another dimension is associated with the list of cloud configurations. In the illustrated example in FIG. 5, the 'z'-axis corresponds to the cloud configurations list being sorted by the cost parameter. For a history table that includes a performance level associated with one dimension (e.g., the 'y'-axis), the cloud configuration list can be maintained along a different axis (e.g., the 'z'-axis) from lowest-to-highest cost, or the reverse. In this example, the system returns the cloud configuration along the axis having the lowest cost.

The search first finds the exact location of the parameter vector in the multi-dimensional space. The search also finds a plane corresponding to the fixed non-functional requirement. Within the plane, the similarity of the requested service with other previous services are explored along the ('x'-) axis location corresponding to the parameter vector. More specifically, in one example, the resource utilization (i.e., the average and variance resource usage) of the requested service is mapped to the corresponding cloud configuration list. The search can go to the x- and y-axes index list, i.e., a region where the axis and plane intersect, based only on the extracted parameter vector. In this manner, the search can be performed in constant time.

Continuing with FIG. 4, if the history table is empty (YES at S408) or no relevant cloud configuration is found after it is searched (YES at S412), an available infrastructure is searched for a new cloud configuration at S414. A search space is explored using a conventional approach, such as the method discussed in U.S. Ser. No. 13/586,180, filed Aug. 15, 2012 and titled Energy Efficiency Improvements in Cloud-Based Environments, by Lee, et al., the content of which is herein incorporated in its entirety. At S416, the cloud configuration management module 118 adds any new cloud configuration that is found by the search at S414 to the history table. Concurrently or subsequently, the system can provide a recommendation for the new cloud configuration to the cloud user at S420.

If cloud configurations are found in the history table (NO at S412), the system 100 determines a status of each similar cloud configuration in the list at s416. Each cloud configuration in the list is tagged as being one of active and inactive. An active tag means that the cloud configuration is currently unavailable because it is being deployed for a different service. An inactive tag means that the cloud configuration is available for deployment. The system 100 searches the cloud configuration list for the most similar cloud configuration that is inactive. If the first determined cloud configuration has active status and is not available for deployment, the system continues to search the database for the first inactive entry that it can find through a linear search. As mentioned, any type of classification method can be used to extract the parameters pertaining to the x-axis (i.e., first dimension) and the linear search.

The system returns the first available (i.e., 'inactive' tag) cloud configuration from the list at S418. The system provides a recommendation for the cloud configuration to the cloud user at S420. The method 422 ends at S424.

Figure 6:
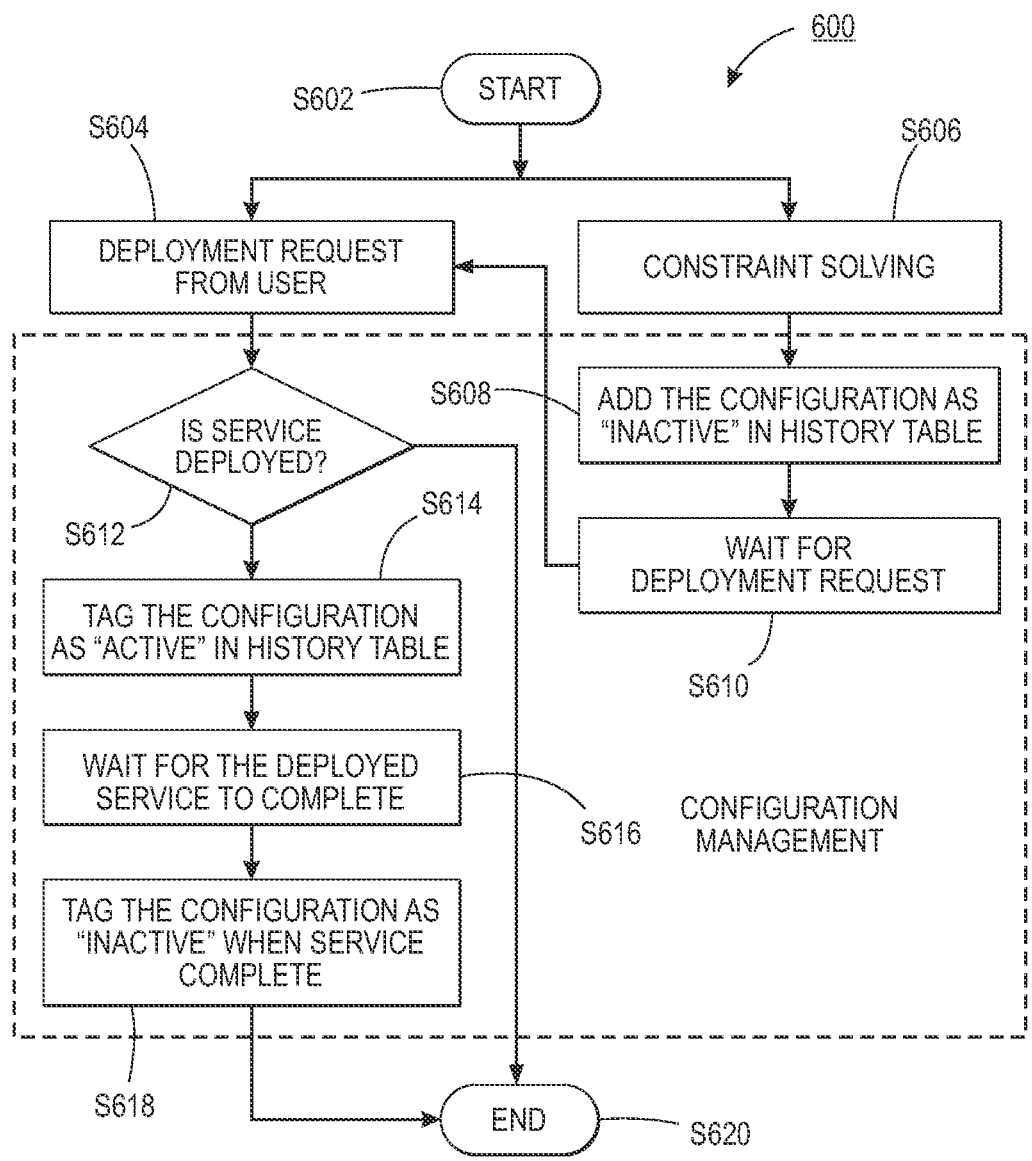
FIG. 6 shows a method performed by the module for maintaining the history table and managing the cloud configurations according to an exemplary embodiment.

If the cloud user accepts the recommended cloud configuration and deploys its service using the cloud configuration, the cloud configuration management module 118 updates the tag associated with the cloud configuration as having an active status. FIG. 6 shows a method 600 performed by the module 118 for maintaining the history table and managing the cloud configurations at S210 in FIG. 2 and S416 in FIG. 4. The method starts at S602. As mentioned, in response to a request for a cloud configuration by a cloud user for deploying a service at S604, a history table is searched. The search is for cloud configurations that were used by the service. If the history table is empty or no cloud configuration is found, module 116 searches the available infrastructure at S606. The cloud management module 118 tags any new cloud configuration found in the search space as being inactive and adds it to the history table at S608.

In one embodiment, the module 118 can search the available infrastructure as a matter of routine (i.e., before a request is received) instead of searching in response to a request. Furthermore, the module 118 can perform routine maintenance on the history table. More specifically, the module 118 can maintain the cloud configuration history for a limited time window. For example, in one embodiment, the history table can store cloud configurations only from the recent past based on the sliding window. The module 118 can remove from the history table any cloud configurations that were searched for and found before the sliding window. In addition to the status tags, the module 118 can maintain a timestamp with each cloud configuration. The timestamp includes the time when the cloud configuration was last used to deploy a service. The module 118 can remove cloud configurations with timestamps that correspond to a time before the sliding window. In this manner, only older cloud configurations that are frequently used are maintained in the database because their timestamps are updated to include recent time.

In this manner, the module 118 can maintain an updated table and wait for a deployment request at S610. The system 100 recommends one of a similar cloud configuration or new cloud configuration that is identified in a respective database or infrastructure search. If the cloud user declines the recommendation (NO at S612), the method 600 ends at S620 When the available cloud configuration is accepted by the user and the service is deployed (YES at S612), the module updates the tag as being 'active' in the history table at S614. The module 118 monitors the deployed service and, more particularly, waits for the deployed service to complete at S616. Once the service completes its execution, the module 118 updates the tag indicating that the cloud configuration is 'inactive' and available for future searches. The method ends at S620.

One aspect of the present disclosure is an ability to reuse previous search results, which increases efficiency. The system maintains a cloud configuration database of previously recommended cloud configurations and provides cloud configurations previously recommended for similar services. Any new request can be responded to quickly by referring to the historical database. In this manner, searches of available infrastructure can be avoided, which means that the search for available resources across multiple data centers, hardware profiles, and virtual machine profiles, etc., is only performed if an initial search of the database produces no results.

Another aspect of the disclosure is an ability to search from the cloud configuration database based on similarity of services in terms of high-level, non-functional requirements (i.e., user preferences) and service behavior pattern. The disclosed process provides for similarity to be determined based on (i) the non-functional preferences, such as, for example, performance or budget/cost, and (ii) the services' behavior, such as, for example, resource usage pattern.

An aspect of searching the cloud configuration database is that it improves a cloud user's experience. By searching for similar cloud configurations or for services that used similar cloud configurations, the system can provide more refined recommendations. The system improves the user's experience by providing faster recommendation results. Furthermore, the availability of previous recommendations can encourage users to subsequently return with other services that require similar cloud configurations.

A further aspect of the disclosure is that the system and method is flexible. In a consumer goods' marketplace (such as, Amazon™ online store), similarity detection is often based on a description text of the goods. In the present disclosure, there is no set definition of similarity of cloud-based services. As the system maintains and searches the database, it compensates for any uncertainty that there might be in mapping similar services to their proper entries in the database based on the services' behavior and non-functional characteristics. Service parameters are identified based on which database is searched and the database's structure. Specifically, the service similarity considers the non-functional parameters of the services in addition to the behavior of the services.

Although the method in FIGS. 2, 4 and 7 are illustrated and described above in the form of a series of acts or events, it will be appreciated that the various methods or processes of the present disclosure are not limited by the illustrated ordering of such acts or events. In this regard, except as specifically provided hereinafter, some acts or events may occur in different order and/or concurrently with other acts or events apart from those illustrated and described herein. It is further noted that not all illustrated steps may be required to implement a process or method in accordance with the present disclosure, and one or more such acts may be combined. The illustrated methods and other methods of the disclosure may be implemented in hardware, software, or combinations thereof, in order to provide the control functionality described herein, and may be employed in any system including but not limited to the above illustrated system 100, wherein the disclosure is not limited to the specific applications and embodiments illustrated and described herein.

The method illustrated in FIGS. 2 and 4 may be implemented in a computer program product that may be executed on a computer. The computer program product may comprise a non-transitory computer-readable recording medium on which a control program is recorded (stored), such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hard-wired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in FIGS. 2, 4 and 7 can be used to implement the method.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method of recommending a cloud configuration to a user device, the method comprising:
receiving a service request at a server computer for a recommended cloud configuration that can be used to deploy a current, requested service;
acquiring a resource usage pattern for the requested service at the server computer, the server computer comprising a processor and a storage device that stores a similarity database maintained as a history table of previously deployed cloud configurations that handled at least one previous service request different from the requested service, wherein the processor:
generates a cloud service recommendation, the generating including:
generating a vector describing a resource usage pattern through a probability distribution function;
computing a similarity based on how close an average resource usage and variance are with any previous service request by mapping the resource usage pattern to a multidimensional space;
determining whether a cloud configuration is located and available in the space; and
in response to the cloud configuration being available, transmitting the recommendation over the network to the user device associated with a cloud user based upon an availability of the recommended cloud service for deployment;
wherein the transmission of the recommendation to the user device causes the server computer to associate the recommended cloud service as a deployed cloud service, monitor an availability of the deployed cloud service, and update a status of the deployed cloud service for future searches.

2. The method of claim 1, wherein the resource usage pattern includes an average resource usage and a variance of resource usage needed for each resource subsystem of a virtual machine to deploy the service.

3. The method of claim 1 further comprising:
generating a vector describing the resource usage pattern;
assigning the resource usage pattern as a first dimension in the multi-dimensional space; and,
searching an axis corresponding to the vector.

4. The method of claim 3 further comprising:
acquiring performance preferences from a user;
assigning the preferences as a second dimension in the multi-dimensional space; and
searching a plane corresponding to the performance.

5. The method of claim 4, wherein the performance preferences are selected from a group consisting of: performance, cost, green point, and a combination of the above.

6. The method of claim 4 further comprising:
assigning cloud configurations as a third dimension in the multi-dimensional space;
searching within a select range a second axis corresponding to where the planes and the first axis intersect; and,
determining whether a cloud configuration is assigned to the range.

7. The method of claim 6 further comprising:
for the cloud configuration being assigned to the axis, determining whether the determined cloud configuration is available for deployment;
for a cloud configuration that is available for deployment, providing a recommendation for the cloud configuration to the user; and,
for a cloud configuration that is not available for deployment, searching the database for a different cloud configuration.

8. The method of claim 1, wherein the providing the recommendation includes:
for a cloud configuration being found in the database, recommending the cloud configuration for the service; and,
for no cloud configuration being found in the database, searching an available infrastructure for the cloud configuration.

9. The method of claim 1, further including:
tagging the cloud configuration as active in response to the cloud configuration being deployed for the service.

10. A computer program product comprising non-transitory media which encodes instructions for performing the method of claim 1.

11. A system for recommending a cloud configuration for deploying a service comprising:
memory which stores instructions for performing the method of claim 1 and a processor, in communication with the memory for executing the instructions.

12. A system for receiving a service request at a server computer for a cloud configuration that can be used to deploy a service, the system comprising:
a storage device for storing a similarity database maintained as a history table of previously deployed cloud configurations; and,
the server computer comprising a processor and a storage device that stores, wherein the processor:
receives a service request at a server computer for a cloud configuration that can be used to deploy a service,
acquires a resource usage pattern for the requested service at the server computer,
generates a cloud service recommendation by:
generating a vector describing a resource usage pattern through a probability distribution function;
computing a similarity based on how close an average resource usage and variance are with any previous service request by mapping the resource usage pattern to a multidimensional space;
determining whether a cloud configuration is located and available in the space; and
in response to the cloud configuration being available, transmitting the recommendation over the network to the user device associated with a cloud user based upon based on an availability of the recommended cloud service for deployment;
wherein after the transmission of the recommendation to the user device, and in response to the recommended cloud service being deployed, monitor an availability of the deployed cloud service, and update a status of the deployed cloud service for future.

13. The system of claim 12, wherein the resource usage pattern includes an average resource usage and a variance of resource usage needed for each resource subsystem of a virtual machine to deploy the service.

14. The system of claim 12, wherein the processor is further adapted to:

generate a vector describing the resource usage pattern;
assign the resource usage pattern as a first dimension in the multi-dimensional space; and,
search an axis corresponding to the vector.

15. The system of claim 14, wherein the processor is further adapted to:
acquire performance preferences from a user;
assign the preferences as a second dimension in the multi-dimensional space; and
search for cloud configurations in a plane corresponding to the performance.

16. The system of claim 15, wherein the performance preferences are selected from a group consisting of: performance, cost, green point, and a combination of the above.

17. The system of claims 15, wherein the processor is further adapted to:
assign cloud configurations as a third dimension in the multi-dimensional space;
search within a select range a second axis corresponding to where the plane and the first axis intersect; and,
determine whether a cloud configuration is assigned to the range.

18. The system of claim 17, wherein the processor is further adapted to:
for the cloud configuration being assigned to the axis, determine whether the determined cloud configuration is available for deployment;
for a cloud configuration that is available for deployment, provide a recommendation for the cloud configuration to the user; and,
for a cloud configuration that is not available for deployment, search the database for a different cloud configuration.

19. The system of claim 12, wherein the processor is further adapted to:
for a cloud configuration being found in the database, recommend the cloud configuration for the service.

20. The system of claim 12, wherein the processor is further adapted to:
for no cloud configuration being found in the database, search an available infrastructure for the cloud configuration.

21. The system of claim 12, wherein the processor is further adapted to:
tag the cloud configuration as active in response to the cloud configuration being deployed for the service.

* * * * *